United States Patent [19]

Yamaguchi et al.

[11] 4,122,491
[45] Oct. 24, 1978

[54] COLOR DEMODULATION APPARATUS

[75] Inventors: Namio Yamaguchi, Ibaraki; Yasuyuki Sato, Takatsuki, both of Japan

[73] Assignee: Matsushita Electric Industrial Co., Ltd., Japan

[21] Appl. No.: 791,002

[22] Filed: Apr. 26, 1977

[30] Foreign Application Priority Data

May 10, 1976 [JP] Japan .................................. 51-53453
Jul. 2, 1976 [JP] Japan .................................. 51-79235

[51] Int. Cl.² ............................................. H04N 9/50
[52] U.S. Cl. ...................................................... 358/23
[58] Field of Search ............................. 358/23, 25, 30

[56] References Cited

U.S. PATENT DOCUMENTS 3,506,776   4/1970   Rennick .................................. 358/23

Primary Examiner—Robert L. Richardson
Attorney, Agent, or Firm—Stevens, Davis, Miller & Mosher

[57] ABSTRACT

Apparatus for demodulating color difference signals from a chroma signal in a color television receiver set includes first and second differential amplifiers and a matrix circuit comprising a constant current circuit. Output terminals of the differential amplifiers and the matrix circuit are connected to a power supply through load resistors of the same resistance, respectively, through which D.C. currents of the same magnitude are passed. Resistors for combining signals are connected to the load resistors, and a common chroma signal is applied to the first and second differential amplifiers while sub-carriers of different phase are applied to the first and second differential amplifiers to effect synchronous detection to demodulate color difference signals of different demodulation axes across the load resistor. With this arrangement, a plurality of stable color difference signals of uniform D.C. level can be produced and the number of terminal pins required can be reduced so that the demodulation apparatus is readily implemented in an integrated circuit structure.

11 Claims, 7 Drawing Figures

FIG.I PRIOR ART

COLOR DEMODULATION APPARATUS

The present invention relates to an apparatus for demodulating color difference signals from a chroma signal in a color television receiver set or the like and provides such an apparatus which is stable in operation and suitable for construction in an integrated circuit structure.

The objects, operation and advantages of the present invention will now be described in conjunction with the accompanying drawings, in which.

Figure 1:
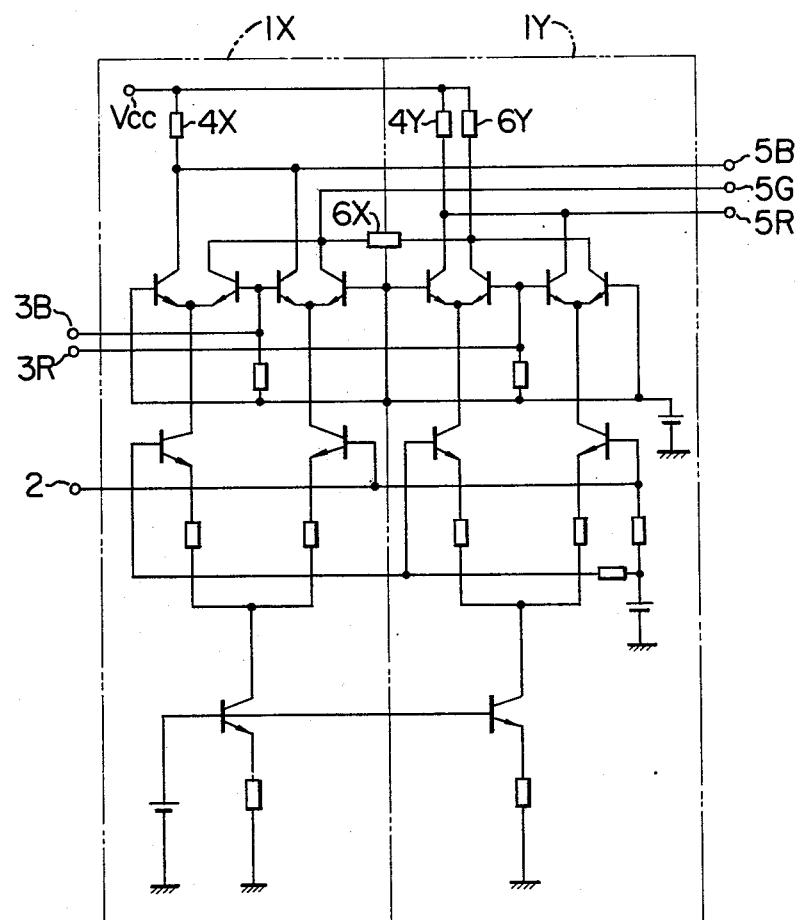
FIGS. 1 to 3 show color demodulation apparatus of the prior art.
Figure 2:
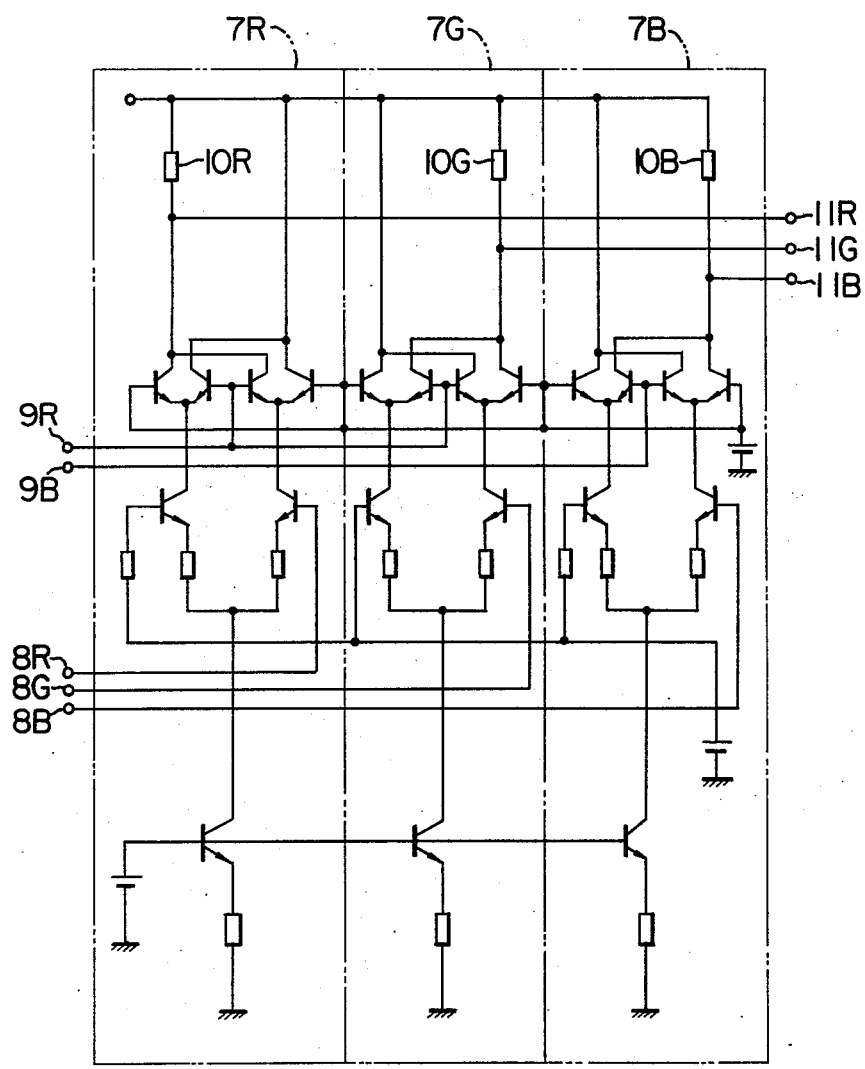
Figure 3:
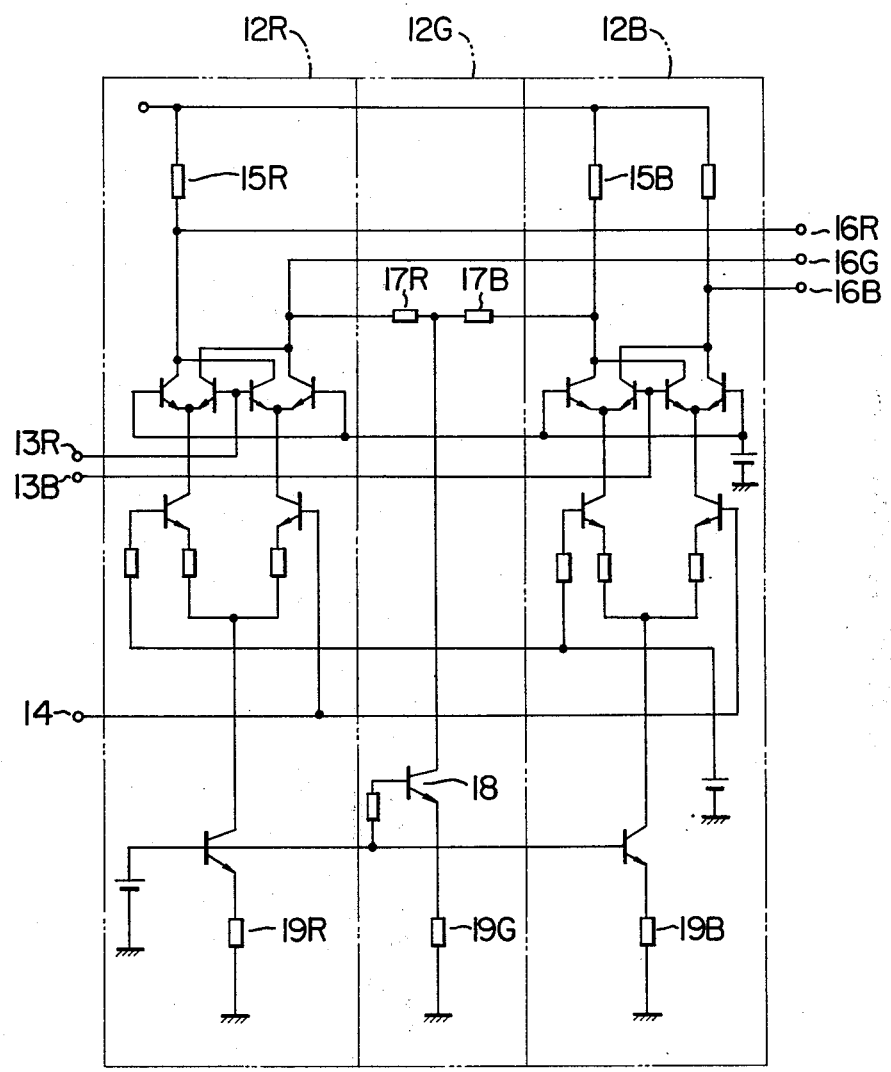

In the color television receiver set or the like, apparatus as shown in FIGS. 1, 2 and 3 have been used to demodulate R-Y, G-Y and B-Y color difference signals from a chroma signal. Those apparatus will be explained first.

In the apparatus of FIG. 1, a pair of first and second differential amplifiers 1X and 1Y are provided, to which a common chroma signal from a chroma signal input terminal is applied while the B-Y axis (0°) and R-Y axis (90°) sub-carriers from sub-carrier input terminals 3B and 3R, respectively, are applied to effect suynchronous detection to produce B-Y and R-Y color difference signals across load resistors connected to collectors of the first and second differential amplifiers 1X and 1Y, respectively, which color difference signals are then fed to output terminals 5B and 5R, respectively. A ratio of resistors 6X and 6Y is selected such that $-(B-Y)$ signal and $-(R-Y)$ signal are combined to produce a G-Y color difference signal, which is fed to an output terminal 5G.

In such an apparatus, however, since the demodulated outputs of the differential amplifiers 1X and 1Y are combined in the resistors 6X and 6Y to produce the G-Y color difference signal, the resistances of the resistors 4X, 4Y, 6X and 6Y should be set to different values. As a result, because the resistances of the load resistors are different from each other, the D.C. levels of the output color difference signals differ from each other. Furthermore, since the D.C. operating points of the differential amplifiers 1X and 1Y differ from each other, the variation between the output color difference signals due to temperature variation or power supply voltage variation increases substantially.

In the apparatus of FIG. 2, first, second and third differential amplifiers 7R, 7G and 7B are provided, to which chroma signals of predetermined phases are applied from chroma signal input terminals 8R, 8G and 8B while R-Y axis (90°) and B-Y axis (0°) sub-carriers are applied from sub-carrier input terminals 9R and 9B to effect synchronous detection to produce R-Y, B-Y and G-Y color difference signals across load resistors 10R, 10G and 10B, respectively, connected to collectors of the differential amplifiers 7R, 7G and 7B, respectively, which color difference signals are then fed to output terminals 11R, 11G and 11B, respectively.

In this arrangement, since the three differential amplifiers 7R, 7G and 7B can be constructed in an identical structure, the D.C. levels of the output color difference signals can be made uniform. In addition, the variation due to the change in ambient conditons can be relieved. On the other hand, since the chroma signals of different phases must be applied to the differential amplifiers 7R, 7G and 7B, the input terminals 8R, 8G and 8B are additionally required. This is disadvantageous in constructing the apparatus in the integrated circuit structure. Particularly in the illustrated example, since the G-Y demodulation is carried out by the color sub-carrier of $-(R-Y)$ axis, the chroma signal to be applied to the input terminal 8G must have been phase shifted by approximately 33°. Accordingly, a phase shift circuit is additionally required.

In the apparatus shown in FIG. 3, the color demodulation circuit comprises first and second differential amplifiers 12R and 12B, and a matrix circuit 12G which matrixes $-(R-Y)$ signal and $-(B-Y)$ signal to produce G-Y signal and which includes a current source uniform which makes the D.C. balances of the outputs. In this arrangement, a common croma signal from a chroma signal input terminal 14 is applied to the differential amplifiers 12R and 12B while R-Y axis (90°) and B-Y axis (0°) sub-carriers are applied from sub-carrier input terminals 13R and 13B to effect synchronous detection to produce R-Y and B-Y color difference signals across load resistors 15R and 15B, respectively, connected to collectors of the first and second differential amplifiers 12R and 12B, respectively, which color difference signals are then fed to output terminals 16R and 16B, respectively. Ratios of the resistors 15B, 17R and 17B are selected such that $-(R-Y)$ signal and $-(B-Y)$ signal are combined to produce a G-Y color difference signal, which is fed to an output terminal 16G. The apparatus of FIG. 3 is an improvement over the apparatus of FIG. 1 and it allows matching of D.C. levels of the output color difference signals. However, when it is desired to match the D.C. levels while charging demodulation axis and gain as desired, the resistor 17B may be eliminated and the collector of transistor 18 may be connected to an intermediate point of the resistor 15B.

In the apparatus of FIG. 3, however, assuming that the apparatus is constructed in the integrated circuit structure such that the resistances of the resistors 19R, 19B and 19G are set near 1 KΩ which assures the manufacture in the integrated circuit with least variance and demodulation gain is set to an optimum value to widen dynamic range and amplifiers are connected to the output terminals 16R, 16G and 16B, then the resistances of the resistors 15B, 17R and 17B are reduced to around 200 Ω, which inevitably causes variation in the resistances. Thus, it has been difficult to attain D.C. balance of the output color difference signals.

Accordingly, each of the prior art apparatus has a disadvantage and could not provide a satisfactory color demodulation apparatus.

It is an object of the present invention to overcome the above defects of the prior art apparatus and provide an apparatus which can produce output color difference signals of uniform D.C. level, reduces out-of-balance due to variation in ambient condition such as temperature change, reduces the number of terminal pins required for the connection of signals and allows the use of resistance which can be manufactured without variance so that the apparatus can be constructed in the integrated circuit structure.

Figure 4:
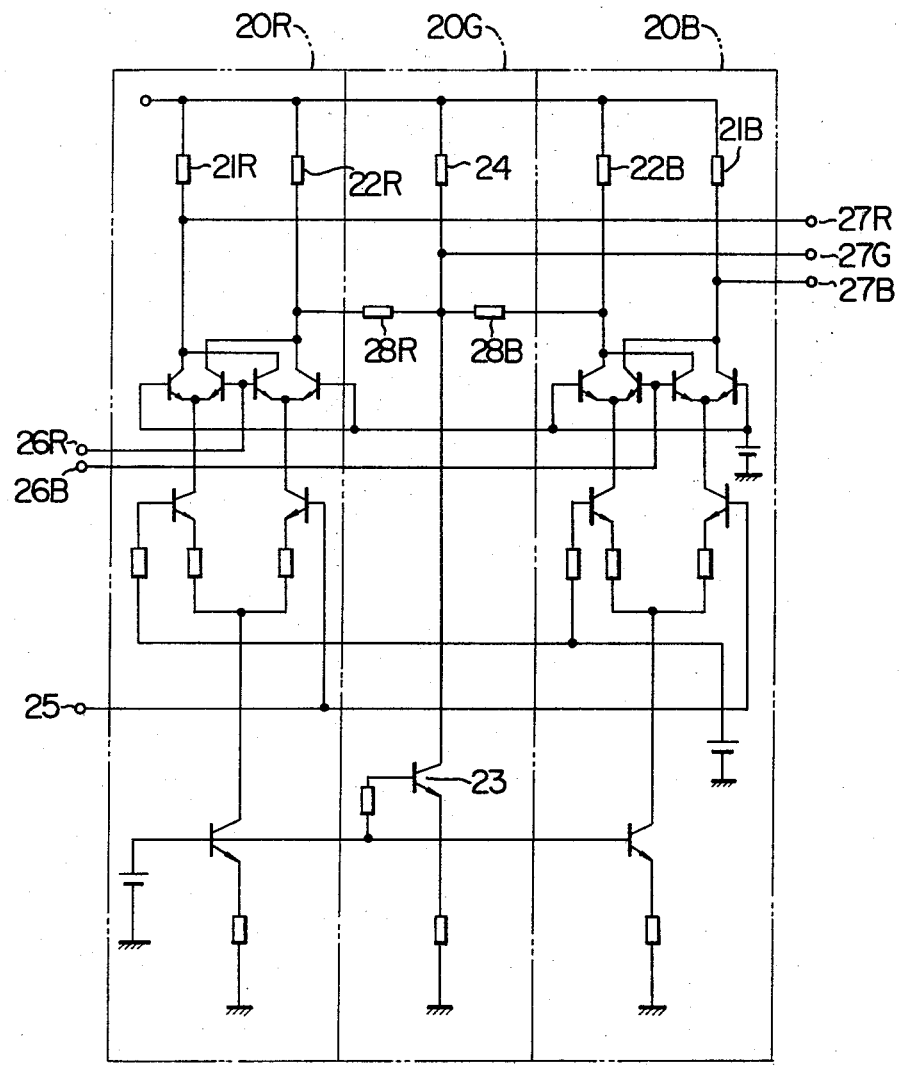
FIG. 4 shows a first embodiment of a color demodulation apparatus of the present invention.

Preferred embodiments of the present invention are now explained. FIG. 4 shows a first embodiment in which numerals 20R and 20B denote a first and second compound differential amplifiers for demodulating R-Y and B-Y color difference signals, respectively, each comprising a combination of emitter coupled transistors and constant current transistors. Numeral 20G denotes a matrix circuit for synthesizing a G-Y color difference signal from −(R-Y) and −(B-Y) signals. The collectors of the first and second differential amplifiers 20R and 20B are connected to a power supply through load resistors 21R, 21B, 22R and 22B of the same resistance. The matrix circuit 20G includes a constant current transistor 23, a collector of which is also connected to the power supply through a resistor 24 having the same resistance as the resistors 21R, 21B, 22R and 22B. D.C. currents of the same magnitude flow through the resistors 21R, 21B, 22R, 22B and 24. A common chroma signal is applied to the first and second differential amplifiers 20R and 20B from a chroma signal input terminal 25 while R-Y axis (90°) and B-Y axis (0°) color subcarriers are applied from color sub-carrier input terminals 26R and 26B, respectively, to effect synchronous detection. Thus, R-Y and B-Y color difference signals are demodulated across the load resistors 21R and 21B of the first and second differential amplifiers 20R and 20B, respectively, which color difference signals are fed to color difference signal output terminals 27R and 27B, respectively.

Between the respective load resistors 22R and 22B of the first and second differential amplifiers 20R and 20B and the load resistor 24 of the matrix circuit 20G, summing resistors 28R and 28B are connected respectively to synthesize the −(R-Y) signal and the −(B-Y) signal, respectively. A ratio of the resistances of the resistors 28R and 28B is selected such that the G-Y axis color difference signal is produced by combining the −(R-Y) signal and the −(B-Y) signal. The resulting G-Y color dfference signal is fed to an output terminal 27G. With this arrangement by proper selection of the resistances of the resistors 21R, 21B, 22R, 22B, 24, 28R and 28B, G-Y demodulation phase and the gain thereof can be set to desired values. Since the resistances of the resistors 21R, 21B, 22R, 22B and 24 are the same, the demodulation gains for R-Y and B-Y are the same. Namely, $$\frac{(B - Y) \text{ component of } G - Y}{B - Y} =$$

$$\frac{\left(\frac{(R_{22R} + R_{28R}) \cdot R_{24}}{R_{22R} + R_{28R} + R_{24}} + R_{28B}\right) \cdot R_{22B}}{\frac{(R_{22R} + R_{28R}) \cdot R_{24}}{R_{22R} + R_{28R} + R_{24}} + R_{28B} + R_{22B}} \times \frac{1}{R_{22B}} =$$

$$\frac{(R_{22R} + R_{28R}) \cdot R_{24} + (R_{22R} + R_{24} + R_{28R}) \cdot R_{28B}}{(R_{22R} + R_{28R}) \cdot R_{24} + (R_{22R} + R_{24} + R_{28R})(R_{22B} + R_{28B})}$$

$$\frac{(R - Y) \text{ component of } G - Y}{R - Y} =$$

$$\frac{(R_{22B} + R_{28B}) \cdot R_{24} + (R_{22B} + R_{24} + R_{28B}) \cdot R_{28B}}{(R_{22B} + R_{28B}) \cdot R_{24} + (R_{22B} + R_{24} + R_{28B})(R_{22R} + R_{28R})}$$

Thus, by adjusting the resistances of the resistors 28R and 28B, the demodulation phase and the demodulation gain for the G-Y color difference signal can be set to desired values. In this case, since the resistances of the resistors 21R, 21B, 22R, 22B, 24, 28R and 28B can be set between 1 kΩ and several kΩ which allow manufacture in the integrated circuit structure without variance, a balanced apparatus can be manufactured.

Furthermore, in this apparatus, since the resistances of the resistors 21R, 21B, 22R, 22B and 24 are the same and the D.C. currents therethrough are also the same, the D.C. levels at the collector output terminals of the first and second differential amplifiers 20R and 20B and at the collector output terminal of the transistor 23 of the matrix circuit 20G are the same. Accordingly, the D.C. levels of the R-Y and B-Y color difference signals as well as the D.C. level of the G-Y color difference signal synthesized from the R-Y and B-Y color difference signals are the same. In addition, since those D.C. levels shift in the same direction by the same amount when the ambient condition such as the power supply voltage changes, the D.C. balance is not lost and a stable color demodulation is always attained.

Furthermore, with this arrangement, a minimum number of signal input/output terminals are required except the power supply terminals. Thus, the total number of terminals can be reduced and hence the apparatus is suitable for construction in the integrated circuit structure.

Figure 5:
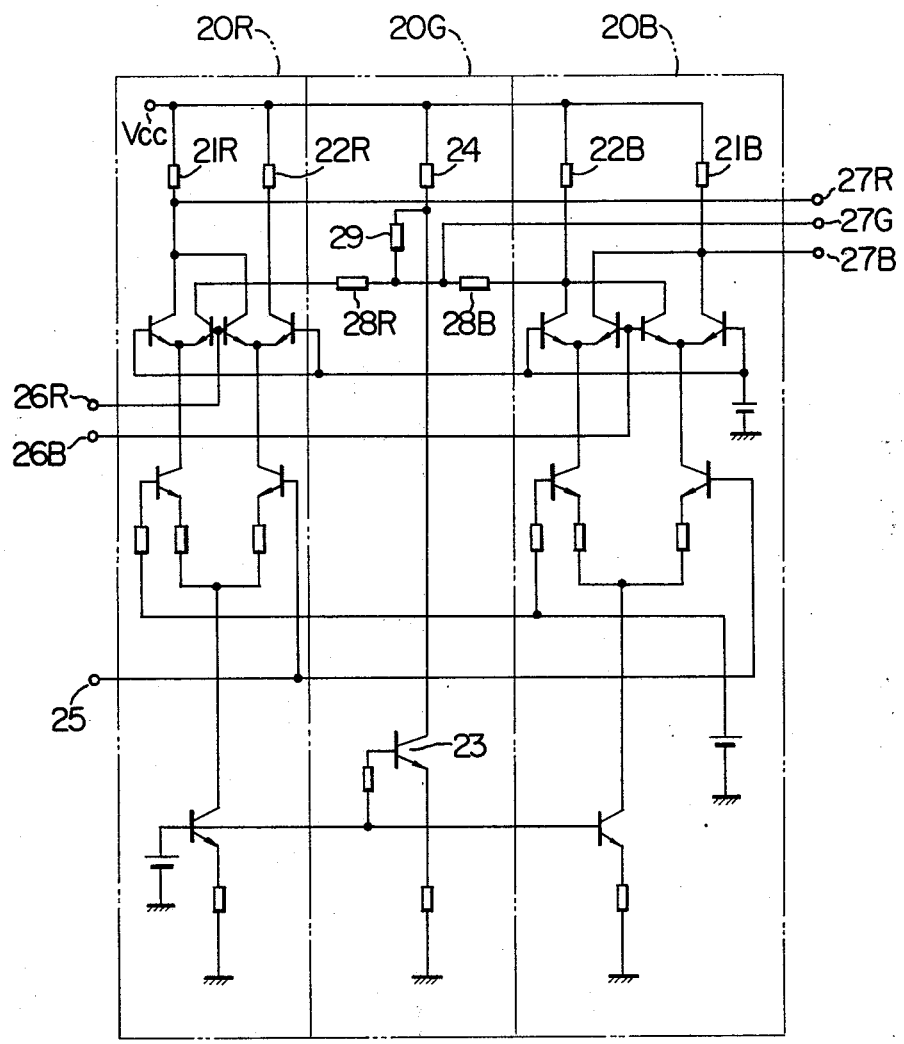
FIG. 5 shows a second embodiment which is a partial improvement of the apparatus of FIG. 4.

When it is desired to increase the demodulated output for the G-Y color difference signal in the above apparatus, a resistor 29 shown in the embodiment of FIG. 5 may be inserted between the junction of the resistors 28R and 28B connected between the output terminals of the first and second differential amplifiers 20R and 20B, and the output terminal of the matrix circuit 20G. With this arrangement, an effect which is equivalent to a case when the dividing ratio in synthesizing the G-Y color difference signal is increased is attained so that the demodulation gain can be increased. The insertion of the resistor 29 does not affect the D.C. operation described above.

Figure 6:
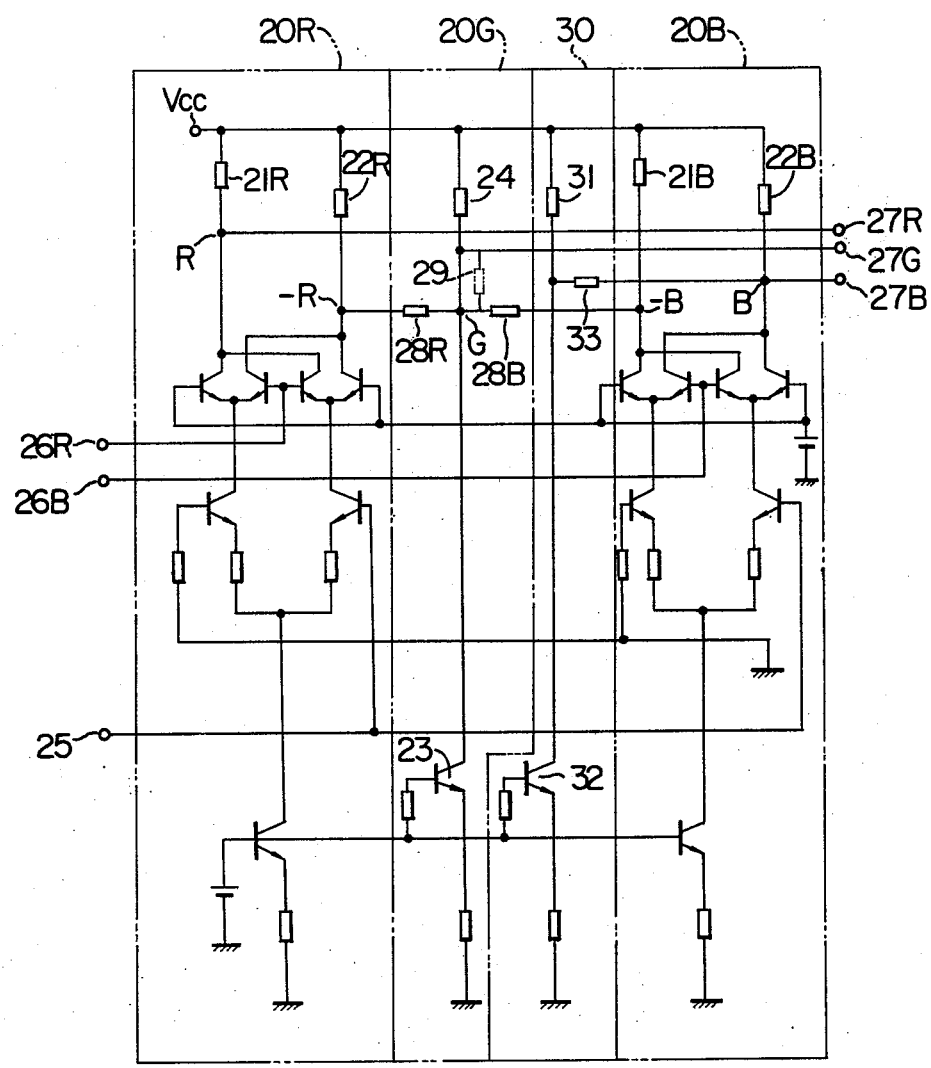
FIG. 6 shows a third embodiment of the apparatus of the present invention.

A modification of the above apparatus is shown in FIG. 6 in which the magnitudes of the color difference signals can be adjusted without changing the D.C. levels thereof. In the apparatus of FIG. 6, a constant current circuit 30 is additionally provided, which has a resistor 31 having the same resistance as the resistors 21R, 21B, 22R, 22B and 24, through which resistor 31 a current having the same magnitude as in the above resistors is passed. As a result, the D.C. level at the output terminal of the resistor 31 is the same as the D.C. levels at the output terminals of the above resistors. Thus, by inserting an additional resistor 33 between the output terminal of the resistor 31 and one of the other resistors 21R, 21B, 22R, 22B and 24, the magnitude of the color difference signal at the output terminal of the above one resistor, that is, the demodulation gain can be adjusted without changing the D.C. level.

For example, when the resistor 33 is connected to a point R or a point −R, the demodulation gain for the R-Y or −(R-Y) color difference signal can be adjusted; when the resistor 33 is connected to a point B or a point −B, the demodulation gain for the B-Y or −(B-Y) color difference signal can be adjusted; and when the resistor 33 is connected to a point G, the demodulation gain and the demodulation axis for G-Y can be adjusted. It should be understood that the adjustment of the demodulation gain for the −(R-Y) or −(B-Y) color difference signal leads to the adjustment of the demodulation gain and the demodulation axis of the G-Y color difference signal.

In the apparatus of FIG. 6, the output terminal of the resistor 24 may be directly connected to the junction of the resistors 28R and 28B or it may be connected through the resistor 29.

While the above embodiments show that the first and second differential amplifiers demodulate the R-Y axis and B-Y axis color difference signals, it should be understood that the present invention can be applied to other cases where X axis and Y axis color difference signals are demodulated or color difference signals of any other axes are demodulated.

As described above, the color demoduation apparatus of the present invention includes the first and second differential amplifiers and the matrix circuit having the constant current circuit, each having the load resistor of the same resistance with the D.C. current of the same magnitude being passed therethrough, and the color difference signals of different axes are produced across the load resistors of the first and second differential amplifiers while the first and second summing resistors are connected between the load resistors of the first and second differential amplifiers and the load resistors of the matrix circuit so that the color difference signal of the other axis is produced across the load resistor of the matrix circuit.

Accordingly, in the apparatus of the present invention, since the resistances of the load resistors are the same and D.C. currents of the same magnitude flow therethrough, the color difference signals of the uniform D.C. level can be demodulated. Furthermore, since the change in the ambient conditions such as temperature change or power supply change, if any, affect equally the respective color difference signals, the color balance is not lost.

Moreover, in the present apparatus, since the resistances of the load resistors and the summing resistors included can be selected to those values which allow the stable manufacture of those resistors in the integrated circuit structure without variation, the apparatus is suitable for construction in an integrated circuit structure.

Furthermore, since a constant current circuit is additionally provided having the load resistor of the same resistance as the other load resistors and the D.C. current of the same magnitude is passed therethrough while the resistor is connected between the load resistor of the constant current circuit and one of the other load resistors, the demodulation gain of the color difference signal produced across that one load resistor can e adjusted without changing the D.C. level. Accordingly, the magnitude of the output color difference signal and/or the demodulation axis can be adjusted without sacrificing the effect of the apparatus.

Figure 7:
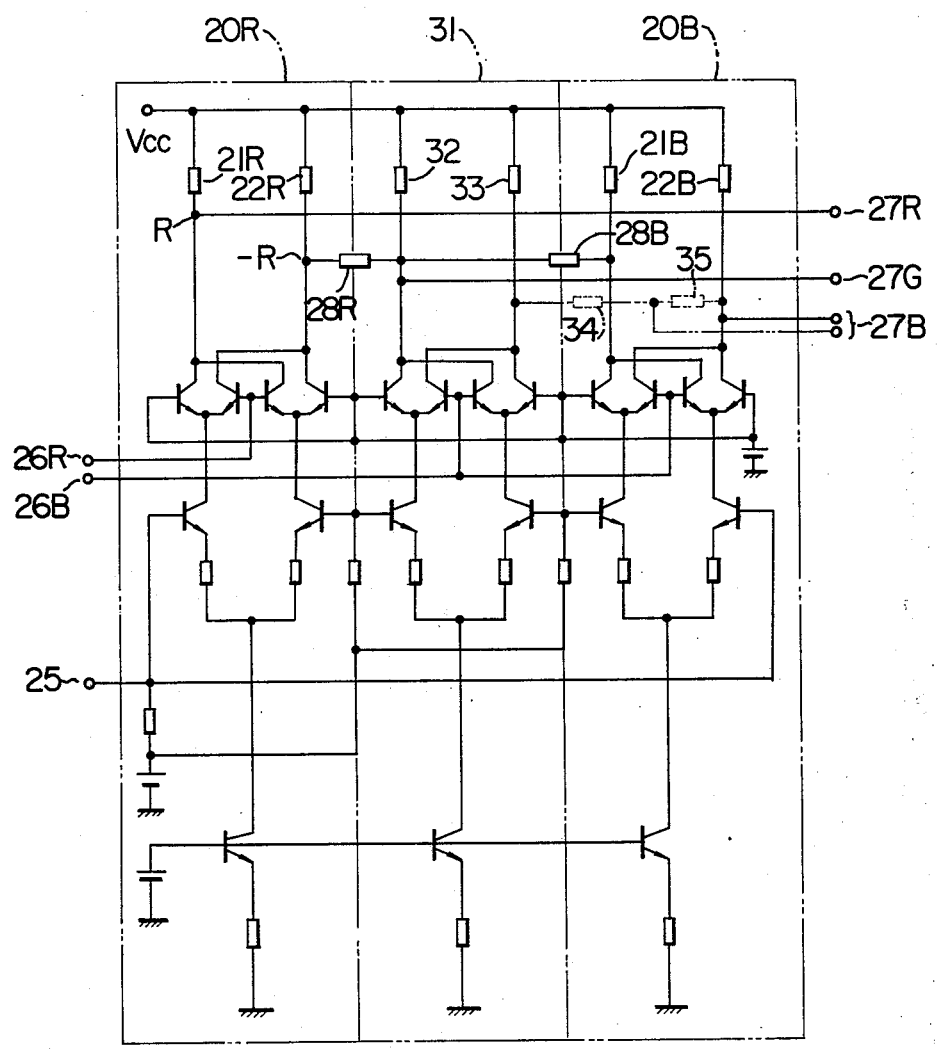
FIG. 7 shows a fourth embodiment of the present invention which includes a further improvement.

Referring to FIG. 7, an embodiment in which a differential amplifier is used as a constant current circuit in the matrix circuit is explained.

In FIG. 7, numerals 20R, 20B and 31 denote compound differential amplifiers each comprising a combination of emitter coupled transistors and constant current transistors. Collectors of the differential amplifiers 20R, 20B and 31 are connected to a power supply through load resistors 21R, 21B and 32 of the same resistance. A common chroma signal is applied to the differential amplifiers 20R and 20B from a chroma signal input terminal 25 while R-Y axis (90°) and B-Y axis (0°) color sub-carriers are applied from color sub-carrier input terminals 26R and 26B, respectively, to effect synchronous detection. Thus, R-Y and B-Y color difference signals are demodulated at the collectors of the differential amplifiers 20R and 20B, respectively, which color difference signals are fed to output terminals 27R and 27B, respectively. Since no chroma signal is applied to the differential amplifier 31, it does not effect synchronous detection and no detected output is produced at the collector thereof.

Synthesizing resistors 28R and 28B are connected between the load resistors 22R and 21B, respectively, and the collector load resistor 32 of the differential amplifier 31 to synthesize −(R-Y) and B-Y color difference signals, respectively. As in the previous embodiments, the ratio of the resistances of the resistor 28R and 28B is selected such that the G-Y color difference signal is produced by combining the −(R-Y) and B-Y color difference signals. As a result, the G-Y color difference signal is produced at the junction of the resistors 28R, 28B and 32 and the color difference signal is fed to an output terminal 27G.

In this manner, with this arrangement all of the R-Y, G-Y and B-Y color difference signals can be demodulated.

It is apparent that only the differential amplifiers 20R and 20B effect synchronous detection and the differential amplifier 31 merely operates in a D.C. manner mode.

However, by connecting the three differential amplifiers 20R, 20B and 31 to the power supply through the load resistors 21R, 21B, 32, 22R, 22B and 33 of the same resistance, they are operated in the same D.C. level and the D.C. potentials of the collectors of the differential amplifiers 20R, 20B and 31 are identical. Accordingly, the resistors 28R and 28B for synthesizing the G-Y color difference signal can be connected between the same D.C. level points so that the G-Y color difference signal can be produced by combining the R-Y and B-Y demodulated output signals without changing the D.C. level. Thus, all of the R-Y, G-Y and B-Y color difference signals can be produced at the same D.C. level.

Accordingly, since the D.C. levels of the collectors of the differential amplifiers 20R, 20B and 31 are identical, the resistor can be connected between any two of them to adjust the amplitude of the color difference signal. For example, by connecting the resistors 34 and 35 as shown by chain lines in FIG. 7, the magnitude of the B-Y color difference signal can be adjusted so that the ratios of the three color difference signals are adjusted to any desired values.

Furthermore, in the present apparatus, since the three differential amplifiers 20R, 20B and 31 operate at the same D.C. condition, the change in the ambient condition such as temperature change or power supply variation, if any, affects identically all of the color difference signals so that the D.C. levels and the ratios of the three color difference signals can be maintained constant. Accordingly, the color change is minimized even when the ambient condition changes.

Moreover, in the present apparatus, since a minimum number of input/output terminals are required except the power supply terminals and the ground terminal, the total number of the terminal pins can be minimized and hence the apparatus is suitable for the construction in the integrated circuit structure.

It should be understood that a particular color difference signal to be demodulated from selected ones of the three differential amplifiers may be selected arbitrarily depending on particular phases of the color sub-carriers applied.

What we claim is:

1. A color demodulation apparatus comprising;
   first and second differential amplifiers;
   a matrix circuit including a constant current circuit;
   means connecting output terminals of said first and second differential amplifiers and an output terminal of said matrix circuit to a power supply through load resistors, respectively, having the same resistance;
   means for passing D.C. currents of the same magnitude through said load resistors;
   synthesizing resistors connected between said load resistors of said first and second differential amplifiers, respectively, and said load resistor of said matrix circuit;
   means for applying a common chroma signal to said first and second differential amplifiers while applying sub-carriers of different phases to said first and second differential amplifiers to effect synchronous detection;
   whereby color difference signals of different axes are produced across said load resistors of said first and second differential amplifiers and said load resistor of said matrix circuit, respectively.

2. A color demodulation circuit according to claim 1 wherein said synthesizing resistors have a common connecting portion directly coupled to said load resistor of said matrix circuit.

3. A color demodulation circuit according to claim 1 wherein said synthesizing resistors have a common connecting portion connected to said load resistor of said matrix circuit through a further resistor.

4. A color demodulation apparatus according to claim 1 wherein R-Y axis and B-Y axis sub-carriers are applied to said first and second differential amplifiers, respectively, and R-Y, B-Y and G-Y color difference signals are produced across the load resistors of said first and second differential amplifiers and said load resistor of said matrix circuit, respectively.

5. A color demodulation apparatus comprising:
   first and second differential amplifiers;
   a matrix circuit including a constant current circuit;
   means connecting input terminals of said first and second differential amplifiers and an output terminal of said matrix circuit to a power supply through load resistors, respectively, having the same resistance;
   means for passing D.C. currents of the same magnitude through said load resistors;
   synthesizing resistors connected between said load resistors of said first and second differential amplifiers, respectively, and said load resistor of said matrix circuit;
   means for applying a common chroma signal to said first and second differential amplifiers while applying sub-carriers of different phases to said first and second differential amplifiers to effect synchronous detection whereby color difference signals of different axes are produced across said load resistors of said first and second differential amplifiers and said load resistor of said matrix circuit, respectively;
   a constant current circuit having a load resistor of the same resistance as said load resistor of said first and second differential amplifiers and said matrix circuit with a D.C. current of the same magnitude as that of said load resistors being passed therethrough;
   a resistor connected between an output terminal of said load resistor of said constant current circuit and a selected one of the output terminals of said first and second differential amplifiers and said matrix circuit to adjust demodulation gain.

6. A color demodulation apparatus according to claim 5 wherein said synthesizing resistors have a common connecting portion directly coupled to said load resistor of said matrix circuit.

7. A color demodulation apparatus according to claim 5 wherein said synthesizing resistors have a common connecting portion connected to said load resistor of said matrix circuit through a further resistor.

8. A color demodulation apparatus according to claim 5 wherein R-Y axis and B-Y axis sub-carriers are applied to said first and second differential amplifiers, respectively, and R-Y, B-Y and G-Y color difference signals are produced across said load resistors of said first and second differential amplifiers and said load resistor of said matrix circuit, respectively.

9. A color demodulation apparatus comprising;
   first, second and third differential amplifiers;
   means for connecting collectors of said first, second and third differential amplifiers through load resistors, respectively, having the same resistance;
   synthesizing resistors connected between the collectors of said first and second differential amplifiers, respectively, and the collector of said third differential amplifier;
   means for applying a common chroma signal to said first and second differential amplifiers while applying sub-carriers of different phases to said first and second differential amplifiers;
   whereby color difference signals of different phases are produced in the collector circuits of said first, second and third differential amplifiers, respectively.

10. A color demodulation apparatus according to claim 9 wherein a voltage dividing resistor is connected between the collectors of said first and second or second and third differential amplifiers so that the magnitudes of the color difference signals are adjusted by the resistance of said dividing resistor.

11. A color demodulation apparatus according to claim 9 wherein R-Y axis and B-Y axis sub-carriers are applied to said first and second differential amplifiers, respectively, and R-Y, G-Y and B-Y color difference signals are produced by said first, second and third differential amplifiers, respectively.

* * * * *